Patented May 1, 1951

2,551,356

UNITED STATES PATENT OFFICE 2,551,356

DRILLING FLUID

Walter J. Weiss, Rolling Hills Area, Calif., assignor to Texaco Development Corporation, New York, N. Y., a corporation of Delaware No Drawing. Application June 24, 1948,
Serial No. 35,062

17 Claims. (Cl. 252—8.5)

This invention relates to drilling fluids and the preparation and control of such as are employed in the drilling of wells.

Drilling muds, or fluids as they are sometimes called, are used in the drilling of wells for tapping underground collections of oil, gas, brine or water. Such muds have different functions, the most important of which are to assist in the removal of cuttings from the well, to seal in formations of gas, oil, or water which may be encountered at different levels, to lubricate the drilling tool and the drill pipe which carries the tool, and to hold the cuttings in suspension in event of shutdowns in drilling.

Drilling muds are essentially mixtures of finely divided solids, such as clay and water, usually so compounded that they weigh about 10 pounds per gallon. When found necessary to increase the specific gravity of a particular mud, it is customary to add thereto finely divided materials of high specific gravities such as iron oxide, barytes, litharge and the like.

The solid phase of a drilling mud consists of colloidal and non-collodial particles. The colloidal particles are responsible for the collodial character of the drilling mud and the existence of such muds as essentially colloidal dispersions. An ideal drilling mud is a thixotropic colloidal system, i. e., a fluid, which on agitation, as by pumping or otherwise, has a relatively low viscosity and is free flowing but when agitation is stopped sets or gels. This gel action is sufficiently slow to permit cuttings in the bore to settle two or three feet before the gel structure which is developing during this time is strong enough to support them.

As used herein, the term "thixotropic drilling mud" is intended to mean a drilling fluid having the proper viscosity, the proper gel rate, and the proper gel strength. When such a drilling fluid is circulated through a well bore, it has a sufficiently high viscosity to carry the cuttings and sand from the bottom of the bore to the surface and it has a sufficiently low gelling rate to allow the cuttings and sand to settle in a settling pit. On standing in a quiescent state, it develops sufficient gel strength to prevent the settling of the cuttings, sand, or barytes, etc. in the well bore itself when it becomes necessary to discontinue circulation of the fluid for any appreciable period of time. Such a mud is also characterized by its ability to form a mud cake on the bore hole wall, thereby assisting in sealing off the traversed formations and inhibiting loss of water from the mud.

The function of the drilling mud in sealing the walls of the bore against the escape of fluid from the mud and the escape of fluids from encountered formations of gas, oil or water is particularly important. Materials such as pre-gelatinized starch are useful for this purpose, such materials being particularly desirable when drilling through caving formations and producing zones with minimum water loss. They are also of assistance in obtaining cores and making formation tests. They have further value in correcting the detrimental influences developed by contamination of the drilling fluid with such substances as salt water. However, such compounds are subject to so-called "souring" as by fermentation. In such cases they lose their desirable properties. This problem is particularly important since such souring may develop within a very short time and without warning.

It is an object of this invention to provide a starch-containing drilling mud wherein the starch or like content is preserved against such souring and deterioration.

Another object of the invention is the provision of a novel method of treating a starch-containing drill mud whereby the spoiling of the starch or equivalent compound therein is prevented.

Further objects and advantages of the invention will appear in the following description taken in connection with the attached claims.

In its broader aspect, the invention involves the use of heavy metal polyphosphates or the reaction products of compounds going to produce such polyphosphates in starch-containing drilling muds, such starch being of the pre-gelatinized type. More specifically, the invention involves the use of such heavy metal polyphosphates in preserving starch or equivalent compounds in such drilling muds and preventing it or them from souring. The reaction products abovementioned are those reaction products of an alkali metal polyphosphate and a heavy metal salt when caused to react in stoichiometric proportions to produce heavy metal polyphosphates. Such heavy metal polyphosphates may be regarded as complex heavy metal polyphosphates in that the heavy metal is not always all available in ionic form and may be considered as sequestered to a greater or less degree.

Such heavy metal polyphosphates are to be distinguished from the complex alkali metal heavy metal phosphates disclosed in my copending application Serial No. 35,061, filed June 24, 1948, and entitled "Improvements in Drilling Fluid."

The aforesaid reaction products, which are believed to be neutral metal polyphosphates but may also include acid or so-called basic metal polyphosphates, may be prepared by reacting the proper stoichiometric proportions of a polyphosphate selected from the left column of the following table and a heavy metal compound selected from the right column:

| Polyphosphates | Heavy Metal Compounds |
|---|---|
| Sodium Tetraphosphate, $Na_6P_4O_{13}$ | $CuSO_4$ |
| Sodium Triphosphate, $Na_5P_3O_{10}$ | $AgNO_3$ |
| Sodium Hexametaphosphate, $Na_6P_6O_{18}$ | $HgCl_2$ |
| Sodium Pyrophosphate, $Na_4P_2O_7$ | $CdSO_4$ |
| Disodium Dihydrogen Pyrophosphate, $Na_2H_2P_2O_7$ | $NiCl_2$ |
| Pyrophosphoric Acid, $H_4P_2O_7$ | |
| Metaphosphoric Acid $(HPO_3)_x$ | $CuCO_3Cu(OH)_2$ Malachite. |

While the sodium salts have been listed it is to be understood that the salts of alkali metals in general, including potassium, lithium and ammonium salts which are sufficiently stable, may be used. The term alkali metal as used herein is intended to include the ammonium radical in such compounds. Likewise the various metals listed in the right column may be used with anions other than those listed, providing that no seriously detrimental or harmful reaction products are formed. The listed compounds are cited only as examples of some of the possible reactants.

It will be noted that the metals listed above are heavy metals as defined in Hackh's Chemical Dictionary, third edition.

The following are listed as examples of the reactions that are believed to take place, the character M representing the metal in a bivalent form. It is to be understood that the equations can also be written for such metals of other valences:

(1) $Na_6P_6O_{18} + 3MSO_4 \rightarrow M_3P_6O_{18} + 3Na_2SO_4$
(2) $Na_4P_2O_7 + 2MSO_4 \rightarrow M_2P_2O_7 + 2Na_2SO_4$
(3) $Na_2H_2P_2O_7 + MSO_4 \rightarrow MH_2P_2O_7 + Na_2SO_4$
(4) $Na_6P_4O_{13} + 3MCl_2 \rightarrow M_3P_4O_{13} + 6NaCl$
(5) $2Na_5P_3O_{10} + 5MCl_2 \rightarrow M_5(P_3O_{10})_2 + 10NaCl$ In Equation 1 when copper, nickel and mercury salts are used, such as copper sulfate, nickel chloride and mercuric chloride, clear solutions were obtained. As examples of these reactions, stoichiometrical quantities of the following reactants were caused to react to form a theoretical 10 grams of the metal polyphosphate.

(6) 10 g. $Cu_3P_6O_{18}$ from 9.22 g. $Na_6P_2O_{18}$ and 11.27 g. $CuSO_4 \cdot 5H_2O$
(7) 10 g. $NiP_6O_{18}$ from 9.43 g. $Na_6P_6O_{18}$ and 10.97 g. $NiCl_2 \cdot 6H_2O$
(8) 10 g. $Hg_3P_6O_{18}$ from 5.70 g. $Na_6P_6O_{18}$ and 7.57 g. $HgCl_2$
(9) 10 g. $CuH_4P_6O_{18}$ from 8.86 g. $HPO_3$ and 1.80 g. $Cu(OH)_2$
(10) 10 g. $Cu_3P_4O_{13}$ from 8.99 g. $Na_6P_4O_{13}$ and 14.22 g. $CuSO_4 \cdot 5H_2O$ In each case the polyphosphate was dissolved or suspended in 80 to 90 ml. distilled water, the metal salt added and the mixture shaken until the reaction appeared to be complete. The solution was then brought up to 100 ml. by the addition of distilled water, all chemical additions to the muds thereafter being based on the premise that 100 ml. of the solution contained 10 grams of the metal polyphosphate.

There is a definite proof that reaction products, presumably including heavy metal polyphosphates, are formed which are different from the original reactants. For example in Equation 10, if there was no reaction, the final 100 ml of mixture would contain only 8.99 grams sodium tetraphosphate and 14.22 grams copper sulfate. This amount of sodium tetraphosphate would overload the starch mud, and the copper sulfate, even in relatively low concentrations, would cause severe flocculation of the mud. Neither occurs. On the contrary, the mud is reduced in viscosity. While sodium sulfate, apparently one of the reaction products, is notoriously detrimental to stock mud in that it causes such mud to flocculate even at nominal concentrations, such flocculation does not occur. This is apparently due to the extraordinary power of the metal polyphosphate as a viscosity reducing agent. The same can be shown with respect to the other reactions.

Typical reaction products were tested to determine their effect on the viscosity of 1:1 Rogers Lake-McKittrick light stock mud at 600 R. P. M. and 77° F. in a Stormer-type viscosimeter, wherein changes had been made to improve the control of the times and rates of rotation. The mud was formed of equal parts by weight of McKittrick light drilling mud clay and Rogers Lake drilling mud clay mixed with tap water to a 600 R. P. M. 77° F. Stormer viscosity of about 50 centipoises. The results are listed in the following table:

| Compound | Stormer Viscosity at 600 R. P. M. and 77° F. Grams of Compound (Dry Basis) per 100 ml. of Starch Mud | | | | |
|---|---|---|---|---|---|
| | Untreated | 0.010 | 0.050 | 0.100 | 0.500 |
| $Cu_3P_6O_{18}$ | 44.6 | 41.6 | 33.1 | 28.1 | 17.3 |
| $Ni_3P_6O_{18}$ | 49.6 | 47.8 | 39.8 | 35.0 | 34.8 |
| $Hg_3P_6O_{18}$ | 49.4 | 49.0 | 39.6 | 38.1 | 29.0 |

The addition of ammonium hydroxide which may form an ammonium complex with the metal polyphosphate is advantageous in that it apparently tends to offset the lowering of the pH of the mud by acidic materials produced by even small amounts of starch deterioration. The use of caustic soda with a conventional copper preservative for this purpose results in the precipitation of the copper as the hydroxide which causes the mud to sour immediately.

The use of ammonium hydroxide for pH control is advantageous in that it affords a convenient and reliable method for maintaining the desired pH range outside the zone of greatest bacterial activity which is at a pH between 6 and 8. Any pH above or below this zone tends to suppress any rank bacterial growth.

To summarize, it will be noted that the reactants are mixed in approximately the desired stoichiometric proportions and the resultant reaction products charged to the drilling mud. In some cases, it may be possible to charge the reactants to the mud in the desired proportions and form the reaction products directly therein. Preforming prior to charging is preferred because of the ability to better observe and control the reaction. The phrase "approximately stoichiometric proportions" as used herein is intended to include those proportions whereby the desired metal polyphosphate is formed.

From the preservative tests conducted thus far, it is believed that the metal polyphosphates function best when charged to the mud initially in relatively large amounts which are supplemented by smaller charges at regular intervals. This method can be termed a "quick-killing" method. The mercury and silver compounds appear to posses a more sustained killing effect and are effective in lower concentrations. This is believed due not only to a higher degree of toxicity of the mercury- and silver-containing complex ions but also to the fact that the complex ions may not be as effectively absorbed by the clay micelle.

In all cases, it is desirable to continue the treatment after the initial charge. As already indicated, a relatively heavy initial charge is desired, this charge being in excess of 0.5 pound dry weight per A. P. I. barrel (42 gallons) of mud. This amount is in excess of 0.15% of the total weight of the mud stream. This initial charge is followed by the addition of smaller charges at regular intervals. An initial charge of 1 to 3 pounds per A. P. I. barrel followed by 1/9 of a pound per tour (8-hour shift) per barrel of starch mud has been found satisfactory in pilot runs. The amount of agent or additive added to a particular mud depends upon numerous factors such as the type of mud, the amount of improvement or the degree of protection that is desired, and the conditions likely to be encountered in the drilling.

The invention may be practiced in a number of different ways. The drilling mud may be prepared by incorporating the desired amount of agent directly in a suspension of clay in water, or the requisite amount may be added as a recovery agent to a drilling mud in which the starch has already deteriorated to some extent. Preferably the agent is added continuously to a drilling mud during use to prevent any substantial change in its physical characteristics.

While the term "reaction products" as used herein is intended primarily to include the apparently complex reaction products, it is also intended to include any other of the reaction products that may contribute to the improved results obtained.

Obviously many modifications and variations of the invention as above set forth may be made without departing from the spirit and scope thereof, and therefore only such limitations should be imposed as are indicated in the appended claims.

I claim:

1. An aqueous starch-containing drilling fluid containing a combined viscosity-controlling and starch-preserving agent comprising reaction products formed in aqueous solution from an alkali metal polyphosphate and a compound containing a heavy metal, said compounds being used in approximately stoichiometric proportions to form a heavy metal polyphosphate, said reaction products being present in sufficient amount to control viscosity of said fluid and preserve the starch content thereof.

2. An aqueous starch-containing drilling fluid containing a combined viscosity-controlling and starch-preserving agent comprising reaction products formed in aqueous solution from an alkali metal polyphosphate and a compound containing copper, said compounds being used in approximately stoichiometric proportions to form a heavy metal polyphosphate, said reaction products being present in sufficient amount to control viscosity of said fluid and preserve the starch content thereof.

3. An aqueous starch-containing drilling fluid containing a combined viscosity-controlling and starch-preserving agent comprising reaction products formed in aqueous solution from an alkali metal polyphosphate and a compound containing mercury, said compounds being used in approximately stoichiometric proportions to form a heavy metal polyphosphate, said reaction products being present in sufficient amount to control viscosity of said fluid and preserve the starch content thereof.

4. An aqueous starch-containing drilling fluid containing a combined viscosity-controlling and starch-preserving agent comprising reaction products formed in aqueous solution from an alkali metal polyphosphate and a compound containing nickel, said compounds being used in approximately stoichiometric proportions to form a heavy metal polyphosphate, said reaction products being present in sufficient amount to control viscosity of said fluid and preserve the starch content thereof.

5. An aqueous starch-containing drilling fluid containing a combined viscosity-controlling and starch-preserving agent comprising reaction products formed in aqueous solution from an alkali metal polymetaphosphate and a compound containing a heavy metal, said compounds being used in approximately stoichiometric proportions to form a heavy metal polymetaphosphate, said reaction products being present in sufficient amount to control viscosity of said fluid and preserve the starch content thereof.

6. An aqueous starch-containing drilling fluid containing a combined viscosity-controlling and starch-preserving agent comprising reaction products formed in aqueous solution from an alkali metal polymetaphosphate and a compound containing copper, said compounds being used in approximately stoichiometric proportions to form a heavy metal polymetaphosphate, said reaction products being present in sufficient amount to control viscosity of said fluid and preserve the starch content thereof.

7. An aqueous starch-containing drilling fluid containing a combined viscosity-controlling and starch-preserving agent comprising reaction products formed in aqueous solution from an alkali metal polymetaphosphate and a compound containing mercury, said compounds being used in approximately stoichiometric proportions to form a heavy metal polymetaphosphate, said reaction products being present in sufficient amount to control viscosity of said fluid and preserve the starch content thereof.

8. An aqueous starch-containing drilling fluid containing a combined viscosity-controlling and starch-preserving agent comprising reaction products formed in aqueous solution from an alkali metal polymetaphosphate and a compound containing nickel, said compounds being used in approximately stoichiometric proportions to form a heavy metal polymetaphosphate, said reaction products being present in sufficient amount to control viscosity of said fluid and preserve the starch content thereof.

9. An aqueous starch-containing drilling fluid containing a combined viscosity-controlling and starch-preserving agent comprising reaction products formed in aqueous solution from an alkali metal pyrophosphate and a compound containing a heavy metal, said compounds being used in approximately stoichiometric proportions to form a heavy metal pyrophosphate, said reaction products being present in sufficient amount to control viscosity of said fluid and preserve the starch content thereof.

10. An aqueous starch-containing drilling fluid containing a combined viscosity-controlling and starch-preserving agent comprising reaction products formed in aqueous solution from an alkali metal pyrophosphate and a compound containing copper, said compounds being used in approximately stoichiometric proportions to form a heavy metal pyrophosphate, said reaction products being present in sufficient amount to control viscosity of said fluid and preserve the starch content thereof.

11. An aqueous starch-containing drilling fluid containing a combined viscosity-controlling and starch-preserving agent comprising reaction products formed in aqueous solution from an alkali metal pyrophosphate and a compound containing mercury, said compounds being used in approximately stoichiometric proportions to form a heavy metal pyrophosphate, said reaction products being present in sufficient amount to control viscosity of said fluid and preserve the starch content thereof.

12. An aqueous starch-containing drilling fluid containing a combined viscosity-controlling and starch-preserving agent comprising the ammonia-treated reaction products formed in aqueous solution from an alkali metal polyphosphate, and a compound containing a heavy metal, said polyphosphate and heavy metal compound being used in approximately stoichiometric proportions to form a heavy metal polyphosphate, said reaction products being present in sufficient amount to control viscosity of said fluid and preserve the starch content thereof.

13. In the art of drilling wells by the employment of an aqueous starch-containing drilling fluid, the process comprising the addition to the drilling fluid of a combined viscosity-controlling and starch-preserving agent comprising reaction products formed in aqueous solution from an alkali metal polyphosphate and a compound containing a heavy metal, said compounds being used in approximately ctoichiometric proportions to form a heavy metal polyphosphate, said reaction products being present in sufficient amount to control viscosity of said fluid and preserve the starch content thereof.

14. In the art of drilling wells by the employment of an aqueous starch-containing drilling fluid, the process comprising the addition to the drilling fluid of a combined viscosity-controlling and starch-preserving agent comprising the ammonia-treated reaction products formed in aqueous solution from an alkali metal polyphosphate, and a compound containing a heavy metal, said polyphosphate and heavy metal compound being used in approximately stoichiometric proportions to form a heavy metal polyphosphate, said reaction products being present in sufficient amount to control viscosity of said fluid and preserve the starch content thereof.

15. In the art of drilling wells by the employment of an aqueous starch-containing drilling fluid, the process comprising the addition to the drilling fluid of a combined viscosity-controlling and starch-preserving agent comprising reaction products formed in aqueous solution from an alkali metal polyphosphate and a compound containing a heavy metal, said compounds being used in approximately stoichiometric proportions to form a heavy metal polyphosphate, said reaction products being present in an amount in excess of 0.15% by weight of the total weight of the fluid.

16. In the art of drilling wells by the employment of an aqueous starch-containing drilling fluid, the process comprising the addition to the drilling fluid of a combined viscosity-controlling and starch-preserving agent comprising reaction products formed in aqueous solution from an alkali metal polyphosphate and a compound containing a heavy metal, said compounds being used in approximately stoichiometric proportions to form a heavy metal polyphosphate, said reaction products being initially charged in a relatively large amount and subsequently charged at periodic intervals in a relatively small amount.

17. In the art of drilling wells by the employment of an aqueous starch-containing drilling fluid, the process comprising the addition to the drilling fluid of a combined viscosity-controlling and starch-preserving agent comprising reaction products of an alkali metal polyphosphate and a compound containing a heavy metal, said compounds being used in approximately stoichiometric proportions to form a heavy metal polyphosphate, said reaction products being initially charged in an amount in excess of 0.5 pound (dry weight) per A. P. I. bbl. of fluid.

WALTER J. WEISS.

REFERENCES CITED

The following references are of record in the file of this patent:

UNITED STATES PATENTS

| Number | Name | Date |
| --- | --- | --- |
| 2,235,955 | Williams | Mar. 25, 1941 |
| 2,294,877 | Wayne | Sept. 1, 1942 |
| 2,324,124 | Williams | July 13, 1943 |
| 2,365,489 | Partridge | Dec. 19, 1944 |
| 2,370,472 | King | Feb. 27, 1945 |
| 2,414,647 | Hoeppel | Jan. 21, 1947 |
| 2,417,307 | Larsen | Mar. 11, 1947 |